US006807549B2

(12) United States Patent
Miron

(10) Patent No.: US 6,807,549 B2
(45) Date of Patent: *Oct. 19, 2004

(54) GENERAL PURPOSE INTERPRETER AND DATABASE FOR ACCESSING ENTERPRISE SERVERS OVER AN INTERNET PROTOCOL NETWORK

(75) Inventor: Mordechay Miron, Tel-Aviv (IL)

(73) Assignee: B.I.S. Advanced Software Systems Ltd., Tel Aviv (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,702

(22) Filed: Jun. 3, 1999

(65) Prior Publication Data

US 2003/0046302 A1 Mar. 6, 2003

(51) Int. Cl.[7] .............................................. G06F 17/30
(52) U.S. Cl. ...................... 707/104.1; 707/10; 707/102
(58) Field of Search ................................. 707/102, 203, 707/104.1, 10, 100

(56) References Cited

U.S. PATENT DOCUMENTS

| 5,495,567 | A |   | 2/1996  | Iizawa et al. |
| 5,623,601 | A | * | 4/1997  | Vu ........................ 395/187.01 |
| 5,701,400 | A |   | 12/1997 | Amado |
| 5,761,656 | A |   | 6/1998  | Ben-Shachar |
| 5,784,553 | A | * | 7/1998  | Kolawa et al. ........ 395/183.14 |
| 5,787,431 | A |   | 7/1998  | Shaughnessy |
| 5,819,090 | A |   | 10/1998 | Wolf et al. |
| 5,889,942 | A |   | 3/1999  | Orenshteyn |
| 5,893,118 | A | * | 4/1999  | Sonderegger ............... 707/203 |
| 5,901,313 | A |   | 5/1999  | Wolf et al. |
| 5,995,958 | A | * | 11/1999 | Xu ................................ 707/3 |
| 6,073,163 | A | * | 6/2000  | Clark et al. ................. 709/203 |
| 6,083,277 | A | * | 7/2000  | Fowlow et al. ................ 717/1 |
| 6,189,103 | B1 | * | 2/2001 | Nevarez et al. ............. 703/201 |
| 6,233,618 | B1 | * | 5/2001 | Shannon ..................... 709/229 |
| 6,324,648 | B1 | * | 11/2001 | Grantges, Jr. ............... 713/201 |

FOREIGN PATENT DOCUMENTS

EP          0713311 A  *  5/1996   ..................... 29/6

* cited by examiner

Primary Examiner—Frantz Coby
(74) Attorney, Agent, or Firm—Eitan, Pearl, Latzer & Cohen Zedek, LLP

(57) ABSTRACT

A software system includes a database containing data related to at least one software application and a general-purpose Java-based interpreter on a computer. The interpreter is coupled to the database and is operative to interpret the data, thus enabling a user of the computer to perform functions of the at least one application.

29 Claims, 17 Drawing Sheets

```
16:21:49  U:           T: N2AQ8101  L: D4B32782  I: BisP390  M: OLM  13/04/98
===========================================================================
   //////    //////                           /////                /////
  NN////    EEEEEE/   //////             /////PPPPP/    /AAAAA/   /SSSSS/
 NNN///    EEEEEE/   TTTTTT/            PPPPPPPPPP/   AAAAAAAA/  SSSSSSS/
NNNN//    EE////    TTTTTT/             PP//////PP/  AA////AA/  SS/////
NNN/NNNN/ EE////      ///TT/      ====/ PP//////PP/  AA////AA/  SS/////
NNN//NNN/ EEEEEE/       /TT/            PPPPPPPP/   AAAAAAAAA/  SSSSSS/
NNN//NNN/ EE////        /TT/            PP/////    AA//////AA/   /SSSSS/
NNN//NN/  EE////        /TT/            PP/        AA//////AA/     //SS/
NNN//N/   EEEEEE/      /TT/             PP/        AA//////AA/  SSSSSS/
NN///     EEEEEE/     /TT/              PP/        AA//////AA/   SSSSS/
===========================================================================

NET-work Parallel Application Session System V4.1.0

Enter LOGOFF at the Userid fileld to leave NET-PASS.

User id:                    Password:              New Password:

Options:                                                           <=>
```

```
Menu  Utilities  Compilers  Options  Status  Help
─────────────────────────────────────────────────────────────────────
                        ISPF Primary Options Menu Option ===> ☐

User ID .   :  P86024
  0  Settings       Terminal and user parameters  Time.       :  11:40
  1  View           Display source data or listings Terminal. :  3278HN
  2  Edit           Create or change source data   Screen.    :  1
  3  Utilities      Perform utility functions      Language.  :  ENGLISH
  4  Foreground     Interactive language processing Appl ID.  :  ISP
  5  Batch          Submit job for language processing TSO logon: SMPROC
  6  Command        Enter TSO or Workstation commands TSO prefix: P86024
  7  Dialog test    Perform dialog testing         System ID  :  MVSA
  8  SDSF           Spool Display and Search Facility MVS acct.: NONE
  A  ACF2           ACF2/ISPF support              Release.   :  ISPF 4.3
  M  Mail           Electronic mail system.
  B  BIUTIL         Bar-Ilan utilities CTM CONTROLM  D DITTO  E SMP/E  HC HCD  I IPCS  L LOOK  O OMEGAMON OC OM/CICS
Enter X to Terminate using log/list defaults F1=Help    F3=Exit    F10=Actions    F12=Cancel
```

FIG.11A

```
Menu  Help
─────────────────────────────────────────────────────────────
                    Utility Selection Panel                        More:  +

Option ===> [ ]

1  Library       Compress or print data set. Print index listing. Print,
                  rename, delete, browse, edit or view members
 2  Data Set      Allocate, rename, delete, catalog, uncatalog, or display
                  information of an entire data set
 3  Move/Copy     Move, copy, or promote members or data sets
 4  Dslist        Print or display (to process) list of data set names.
                  Print or display VTOC information
 5  Reset         Reset statistics for members of ISPF library
 6  Hardcopy      Initiate hardcopy output
 7  ISPF C/S      Install ISPF C/S workstation code from MVS to your workstation.
 8  Outlist       Display, delete, or print held job output
 9  Commands      Create/change an application command table
 *  Reserved      This option reserved for future expansion.
11  Format        Format definition for formatted data Edit/Browse
12  SuperC        Compare data sets                                  (Standard Dialog)
13  SuperCE       Compare data sets Extended                         (Extended Dialog)
14  Search-For    Search data sets for strings of data               (Standard Dialog)
15  Search-ForE   Search data sets for strings of data Extended      (Extended Dialog)

F1=Help    F3=Exit     F10=Actions    F12=Cancel
```

FIG.11B

GENERAL PURPOSE INTERPRETER AND DATABASE FOR ACCESSING ENTERPRISE SERVERS OVER AN INTERNET PROTOCOL NETWORK

FIELD OF THE INVENTION

The present invention relates to enterprise servers in general and to Web-enablement of enterprise servers in particular.

BACKGROUND OF THE INVENTION

Currently most of the valuable computerized information belonging to a company is stored on computers known in the art as enterprise servers. Examples are mainframes, as well as computers running one of the following operating systems: AS/400, Unix, VAX and NT. Each enterprise server (ES) will have its own database(s) and application(s) to allow access to the information stored in the server. The user interface of these ES applications is generally text-oriented and presented in what are known in the art as "green screens". Modern applications, by contrast have graphical user interfaces (GUI) and are more user friendly.

A recent trend in information technology is e-business/e-commerce applications. Its purpose is to give access to information stored in enterprise servers via the Internet or a company Intranet, either by developing new Web-enabled applications or by converting the green screens of existing ES applications to Web-enabled applications, a technique known as "screen wrapping". The Web-enabled applications are generally either a collection of HyperText Markup Language (HTML) files, or Java code in the form of a Java applet or a stand-alone Java program. Products for HTML conversion of green screens are commercially available from Attachmate Corporation of Bellevue, Wash., USA.

For HTML-based solutions, the user's computer requires only a Web browser, while a Web server brokers all communication between the Web browser and the enterprise server. The Web browser is independent of the ES application, and can therefore be used to display HTML pages generated for several different ES applications. Moreover, the Web server brokers all communication between the ES and the Web browser, and can therefore control the information transmitted to the ES. However, precisely because each transaction must pass through the Web server, the Web server becomes a bottleneck. Another disadvantage is that HTML commands are not capable of producing the rich GUI and functionality available through Java.

A Java-based Web-enabled application has many advantages. The Java client enables distributed processing by using client resources for data processing instead of enterprise server resources. Java clients have a rich graphical user interface and powerful functionality, including the ability to directly access enterprise servers.

However, a particular Java client performs a particular set of functions on an enterprise server. In other words, it is a dedicated client with a single purpose. It is not suitable for accessing other enterprise servers and their applications, or even for accessing the same enterprise server to perform a different set of functions. Therefore, a user wishing to run different applications on one or more enterprise servers requires a dedicated Java client for each application. The size of the Java applet, and therefore the time required to download it, will increase in correlation to the complexity of the application. In the case of a stand-alone Java program or an installed Java applet, the client must be downloaded and reinstalled each time the application is modified.

If the Java client is the product of a Java code generator, such as Jacada from CST of Herzliya, Israel and OpenVista from OpenConnect Systems Inc. of Dallas, Tex., USA, then there are a number of additional disadvantages. The Java code generator generates Java code for each green screen of an ES application. The Java code collectively forms a Java applet which can then be downloaded from a Web server to a user's computer running a browser. The size of the Java applet increases for each green screen of the ES application, approximately 5–20 Kilobytes (KB) per green screen. An ES application having 200 green screens, for example, is converted to a Java applet of approximately 1 MegaByte (MB). Downloading such a large Java applet is time-consuming. The user is required to download the entire Java applet even if he may need to use only a few of the screens. Since the Java applet is essentially a screen wrapper of the original green screens of the FS application, other sources of data are not easily integrated into the Java applet.

SUMMARY OF THE INVENTION

There is provided, in accordance with a preferred embodiment of the present invention, a software system including a database containing data related to at least one software application, and a general-purpose interpreter on a computer. The interpreter is coupled to the database and the interpreter interprets the data thus enabling a user of the computer to perform functions of the at least one application.

Moreover, in accordance with a preferred embodiment of the present invention, the computer is connected to a network having an enterprise server computer connected thereto. The interpreter connects to the enterprise server computer to perform functions of the at least one application on the enterprise server computer.

Furthermore, in accordance with a preferred embodiment of the present invention, the computer is connected to a network, and the system further includes a remote function server, located on a second computer. The second computer is connected to the network and to en enterprise server computer. The interpreter instructs the remote function server to perform functions of the at least one application on the enterprise server computer.

Moreover, in accordance with a preferred embodiment of the present invention, the computer is connected to a network, and the system further includes a gateway connected to the network. The gateway reroutes communication between the interpreter and other computers connected to the network.

Furthermore, in accordance with a preferred embodiment of the present invention, the computer is connected to a network, and the system further includes a gateway on a firewall connected to the network. The gateway reroutes communication between the interpreter and other computers located behind the firewall.

Additionally, in accordance with a preferred embodiment of the present invention, the computer is connected to a network, and the system further includes a first gateway connected to the network, and a second gateway on a firewall connected to the network. The first gateway reroutes communication between the interpreter and other computers connected to the network. The second gateway reroutes communication between the first gateway and other computers located behind the firewall.

Moreover, in accordance with a preferred embodiment of the present invention, the network is the Internet or an Intranet.

Furthermore, in accordance with a preferred embodiment of the present invention, the system further includes a graphical application builder for generating the data. Preferably, the builder includes a designer for designing new screens of the at least one application, and an organizer for assigning functionality to controls of the new screens.

Moreover, in accordance with a preferred embodiment of the present invention, the interpreter displays the new screens on the computer and reacts to user-initiated input according to the functionality.

Furthermore, in accordance with a preferred embodiment of the present invention, the builder further includes a recorder for recording old screens of the at least one application.

Additionally, in accordance with a preferred embodiment of the present invention, the designer and organizer are operative to design a template for new screens. The template has at least one dynamic control, and the designer is also operative to associate a portion of the old screens with the template.

There is also provided in accordance with a preferred embodiment of the present invention a graphical application builder. The builder includes a designer for designing new screens of a software application, and an organizer for assigning functionality to controls of the new screens. Output of the builder is date related to the software application which is stored in a database.

Moreover, in accordance with a preferred embodiment of the present invention, the builder further includes a recorder for recording old screens of the software application.

Furthermore, in accordance with a preferred embodiment of the present invention, the designer and organizer are operative to design a template for new screens. The template has at least one dynamic control, and the designer is also operative to associate a portion of the old screens with the template.

There is also provided in accordance with a preferred embodiment of the present invention a method for enabling a user of a computer to perform functions of at least one application. The method includes the steps of retrieving data related to the at least one application from a database, and interpreting the data by a general-purpose interpreter on a computer, the interpreter coupled to the database.

Moreover, in accordance with a preferred embodiment of the present invention the computer is connected to a network having an enterprise server computer connected thereto, and the method further includes the steps of connecting to the enterprise server computer, and performing functions of the at least one application on the enterprise server computer.

Furthermore, in accordance with a preferred embodiment of the present invention, the computer is connected to a network having an enterprise server computer and a second computer connected thereto, and the method further includes the step of instructing a remote function server located on the second computer to perform functions of the at least one application on the enterprise server computer.

Moreover, in accordance with a preferred embodiment of the present invention, the computer is connected to a network having a gateway connected thereto, and the method further includes the step of rerouting communication between the interpreter and other computers connected to the network.

Furthermore, in accordance with a preferred embodiment of the present invention, the computer is connected to a network having a gateway on a firewall connected thereto, and the method further includes the step of rerouting communication between the interpreter and other computers located behind the firewall.

Additionally, in accordance with a preferred embodiment of the present invention, the computer is connected to a network having a first gateway connected thereto and a second gateway on a firewall connected thereto. The method further includes the steps of rerouting by the first gateway communication between the interpreter and other computers connected to the network, and rerouting by the second gateway communication between the first gateway and other computers located behind the firewall.

Moreover, in accordance with a preferred embodiment of the present invention, network is the Internet or an Intranet.

Furthermore, in accordance with a preferred embodiment of the present invention, the method further includes the step of generating the data with a graphical application builder.

Additionally, in accordance with a preferred embodiment of the present invention, the step of generating includes the steps of designing new screens of the at least one application, and assigning functionality to controls of the new screens.

Moreover, in accordance with a preferred embodiment of the present invention, the method further includes the step of displaying the new screens on the computer.

Furthermore, in accordance with a preferred embodiment of the present invention, the method further includes the step of reacting to user-initiated input according to the functionality.

Moreover, in accordance with a preferred embodiment of the present invention, the method further includes the step of recording old screens of the application.

Additionally, in accordance with a preferred embodiment of the present invention, the method further includes the steps of designing a template for new screens, the template having at least one dynamic control, and associating a portion of the old screens with the template.

There is also provided in accordance with a preferred embodiment of the present invention a method for graphically building a software application. The method includes the steps of designing new screens of a software application, assigning functionality to controls of the new screens, and storing data related to the new screens and the functionality in a database.

Moreover, in accordance with a preferred embodiment of the present invention, the method further includes the step of recording old screens of the software application.

Furthermore, in accordance with a preferred embodiment of the present invention, tho method further includes the steps of designing a template for new screens, the template having at least one dynamic control, and associating a portion of the old screens with the template.

BRIEF DESCRIPTION OF THE DRAWINGS

The present invention will be understood and appreciated more fully from the following detailed description taken in conjunction with the appended drawings in which:

FIG. 7 is a schematic illustration of a typical prior art green screen;

FIG. 9 is a schematic illustration of an example new screen that is a graphical version of the green screen of FIG. 7 created using the default template.

FIGS. 11A and 11B are schematic illustrations of typical prior art green screens.

DETAILED DESCRIPTION OF THE PRESENT INVENTION

The present invention is directed to a system which provides full Web-accessibility to enterprise server (ES) platforms such as mainframes, AS/400, Unix, VAX and NT. The system includes a thin client which is independent of the particular application to be run. This thin client can be installed once and used for several different applications. For the remainder of this description, a Java based client has been described. It will be appreciated by these skilled in the art that the client may be written in any suitable programming language, such as C, C++, Pascal and Fortran.

The present invention is also directed to a graphical application builder whose output is database data.

Figure 1:
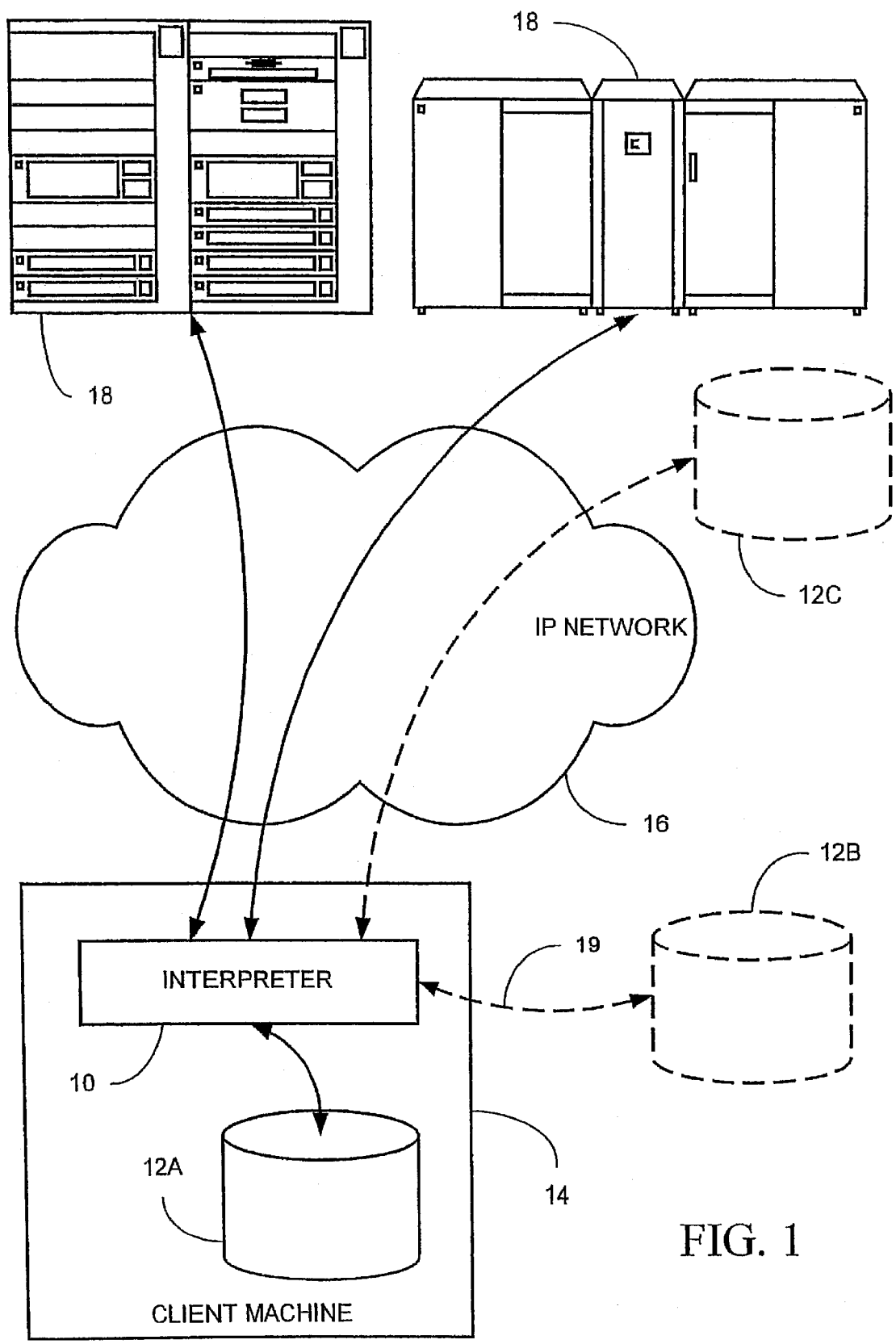
FIG. 1 is a schematic illustration of a software system according to a preferred embodiment of the present invention.

Reference is now made to FIG. 1, which is a schematic illustration of a software system according to a preferred embodiment of the present invention. The software system comprises a general-purpose Java-based interpreter 10 which interprets data stored in an application rules database 12. The interpreter 10 may be a Java applet running in a Web browser or a stand-alone Java program. The interpreter 10 resides on a client machine 14, such as a personal computer, a workstation, a notebook or a laptop, which is connected to an Internet Protocol (IP) network 16 such as the Internet or an Intranet. At least one enterprise server 18 is also connected to the network 16. The application rules database 12 containing data related to an application is accessible by the interpreter 10. The application rules database 12 could be an application rules database 12A, which is accessible locally on the client machine 14, an application rules database 12B, which is accessible via a local area network 19, application rules database 12C, which is accessible via the IP network 16.

In operation, the interpreter 10 retrieves data from the database 12 in order to present a user of the client machine 14 with an interface to the application. The Interpreter 10 connects to the enterprise server 18 via the network 16 to perform functions of the application on the enterprise server 18.

Figure 2:
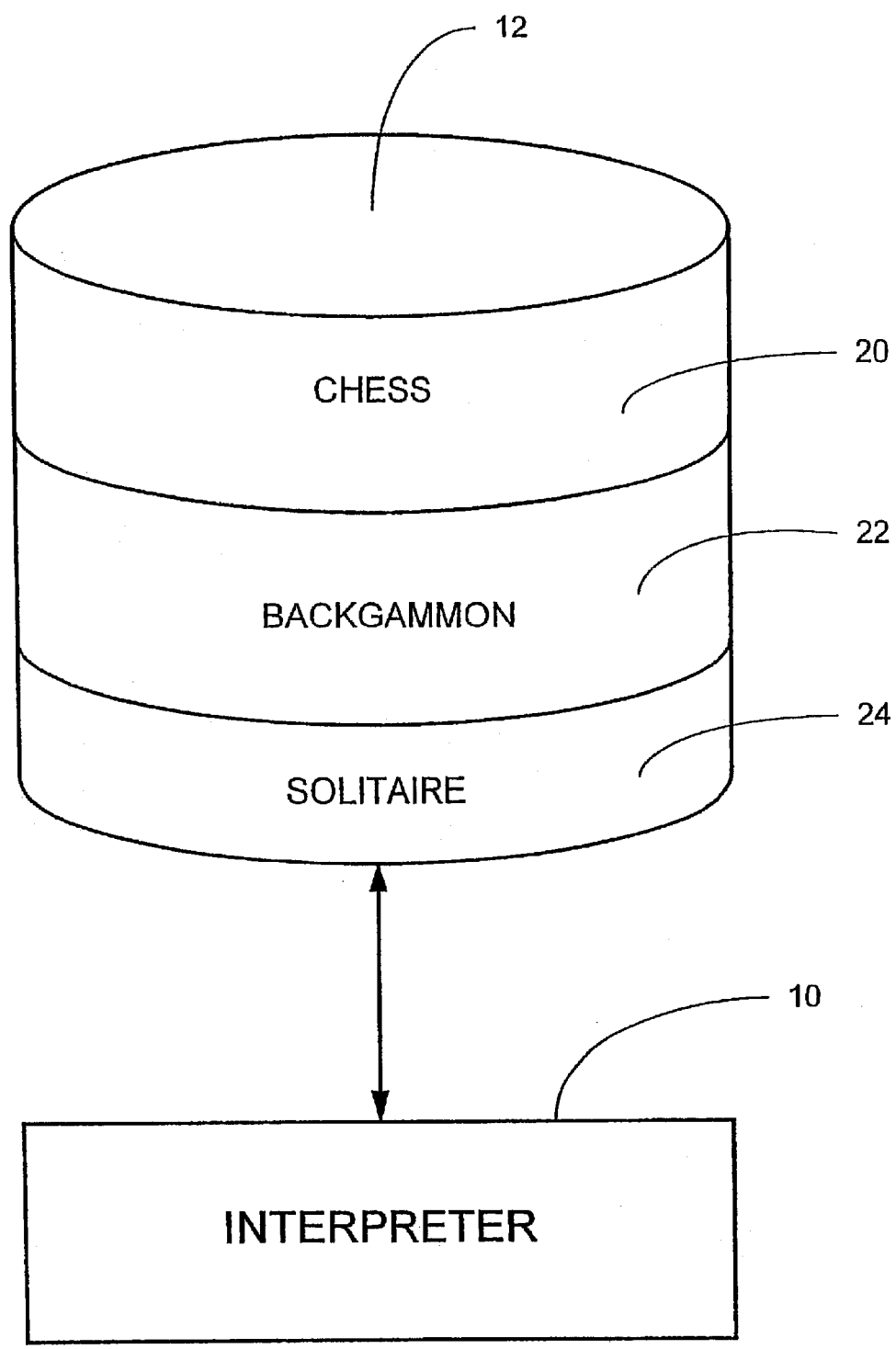
FIG. 2 is a schematic illustration of an interpreter and an application rules database according to a preferred embodiment of the present invention.

Reference is now made briefly to FIG. 2, which is a schematic illustration of an interpreter and an application rules database according to a preferred embodiment of the present invention. Similar features are represented by similar reference numerals. The general-purpose Java-based interpreter 10 interprets data stored in the application rules database 12. The application rules database 12 contains data related to applications. For example, the application rules database 12 contains data 20 related to the game of chess, data 22 related to the game of backgammon, and data 24 related to the game of solitaire. In operation, the interpreter 10 interprets the data 20 thereby enabling a user to play chess. Similarly, the interpreter 10 interprets the data 22 and 24 thereby enabling a user to play backgammon and solitaire, respectively.

The interpreter 10 contains general functionality for the flow of an application as well as general functionality related to graphical presentation of an application. The data 20 contains information related to the graphical presentation of chess, as well as information related to the logic and rules of the game of chess. Similarly, the data 22 and 24 contain information related to the graphical presentation, logic and rules of backgammon and solitaire, respectively.

It will be appreciated that the software system of the present invention is equally suitable for applications not requiring connectivity to an enterprise server. The minimal components of the software system are the interpreter 10 and application rules database 12 shown in FIG. 2.

Figure 3:
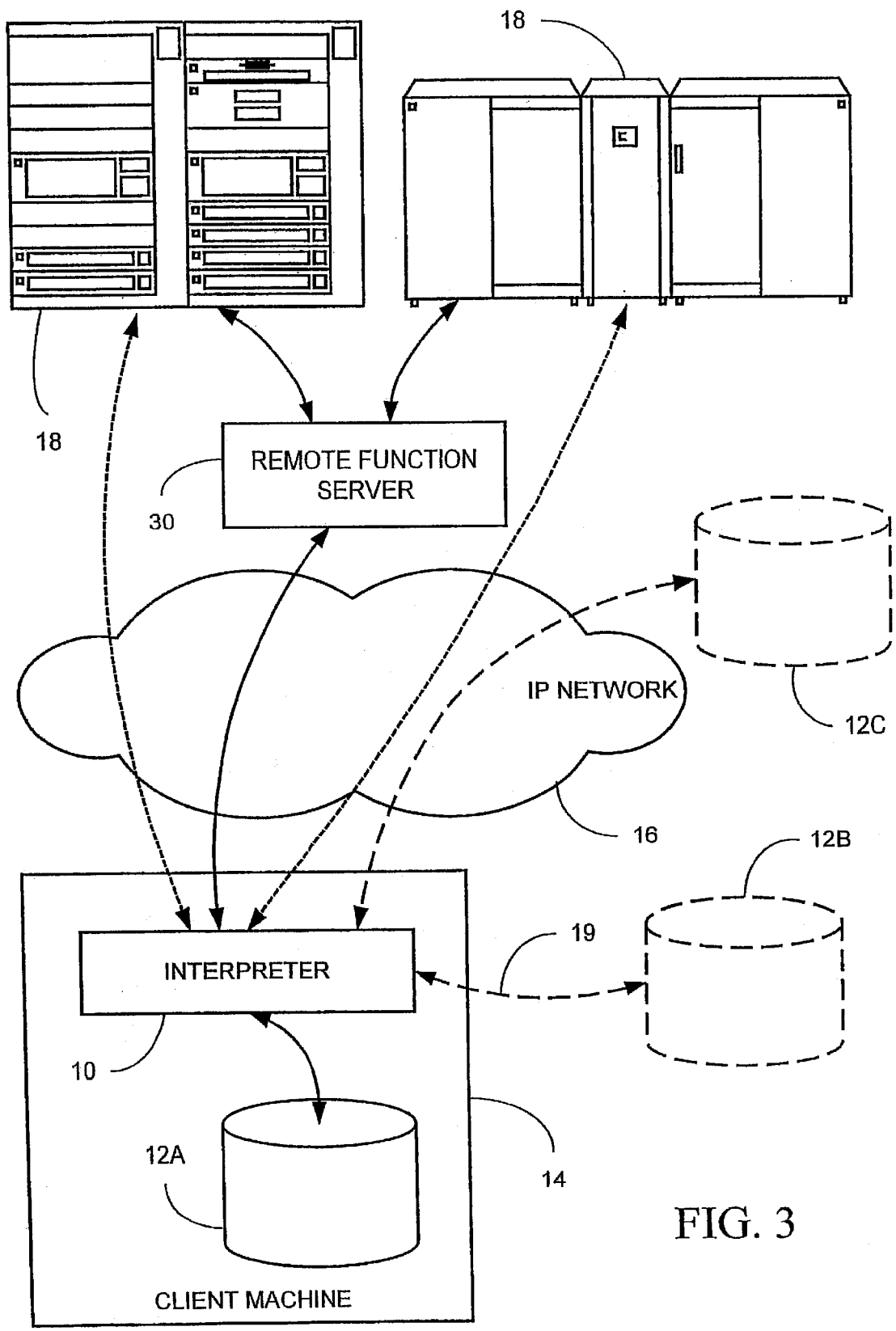
FIG. 3 is a schematic illustration of a software system according to another preferred embodiment of the present invention.

Reference is now made to FIG. 3, which is a schematic illustration of a software system according to another preferred embodiment of the present invention. FIG. 3 is similar to FIG. 1, with the addition that the software system includes a remote function server 30 connected to the IP network 16 and the enterprise server 18. If the interpreter 10 is unable to perform a particular function of the application on the enterprise server 18, as indicated by the dotted lines, the interpreter 10 connects to the remote function server 30 and instructs it to perform the function in place of the interpreter 10.

There are several reasons that the interpreter 10 may be unable to perform a particular function on the enterprise server 18, some of which are described hereinbelow. If the enterprise server 18 is not connected to the IP network 16 or is behind a firewall, then the interpreter 10 cannot access the enterprise server 18 directly. For security reasons, if may be desirable not to allow an arbitrary client to connect to the enterprise server 18 via the Internet. The function may require software capability that the interpreter 10 does not possess. For example, the function may require the interpreter 10 to directly access a database of the enterprise server 18. If the interpreter 10 does not include a database driver, for example, an Open DataBase Connectivity (ODBC) driver, then the function cannot be performed. The function may use tools written in various programming languages which cannot work from within the Java-based interpreter 10.

Since the remote function server 30 is connected to the enterprise server 18, either via a local area network or via the IP network 16, the remote function server 30 can perform functions remotely for the interpreter 10.

Figure 4A:
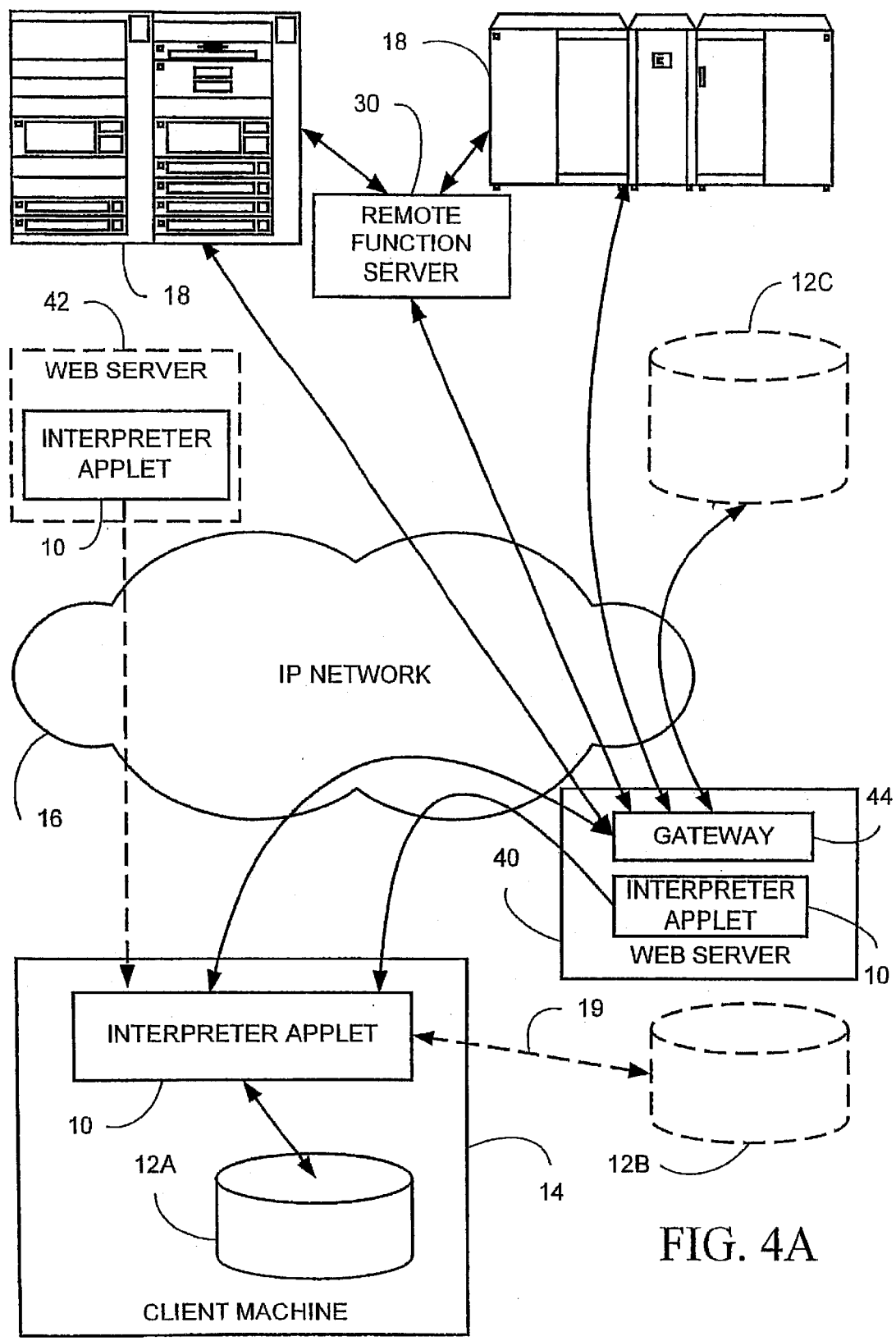
FIGS. 4A, 4B and 4C are schematic illustrations of software systems according to further preferred embodiments of the present invention.
Figure 4B:
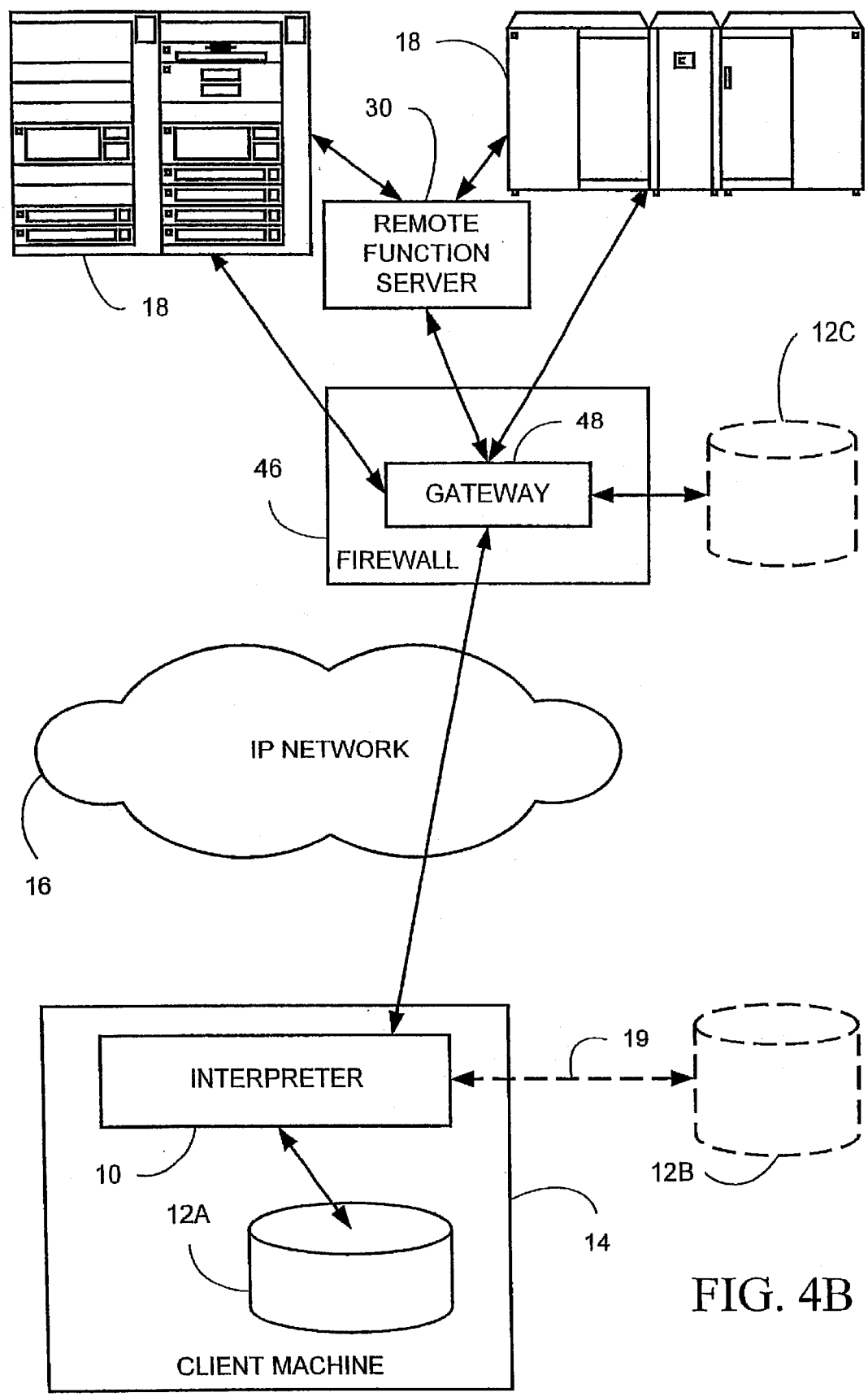
Figure 4C:
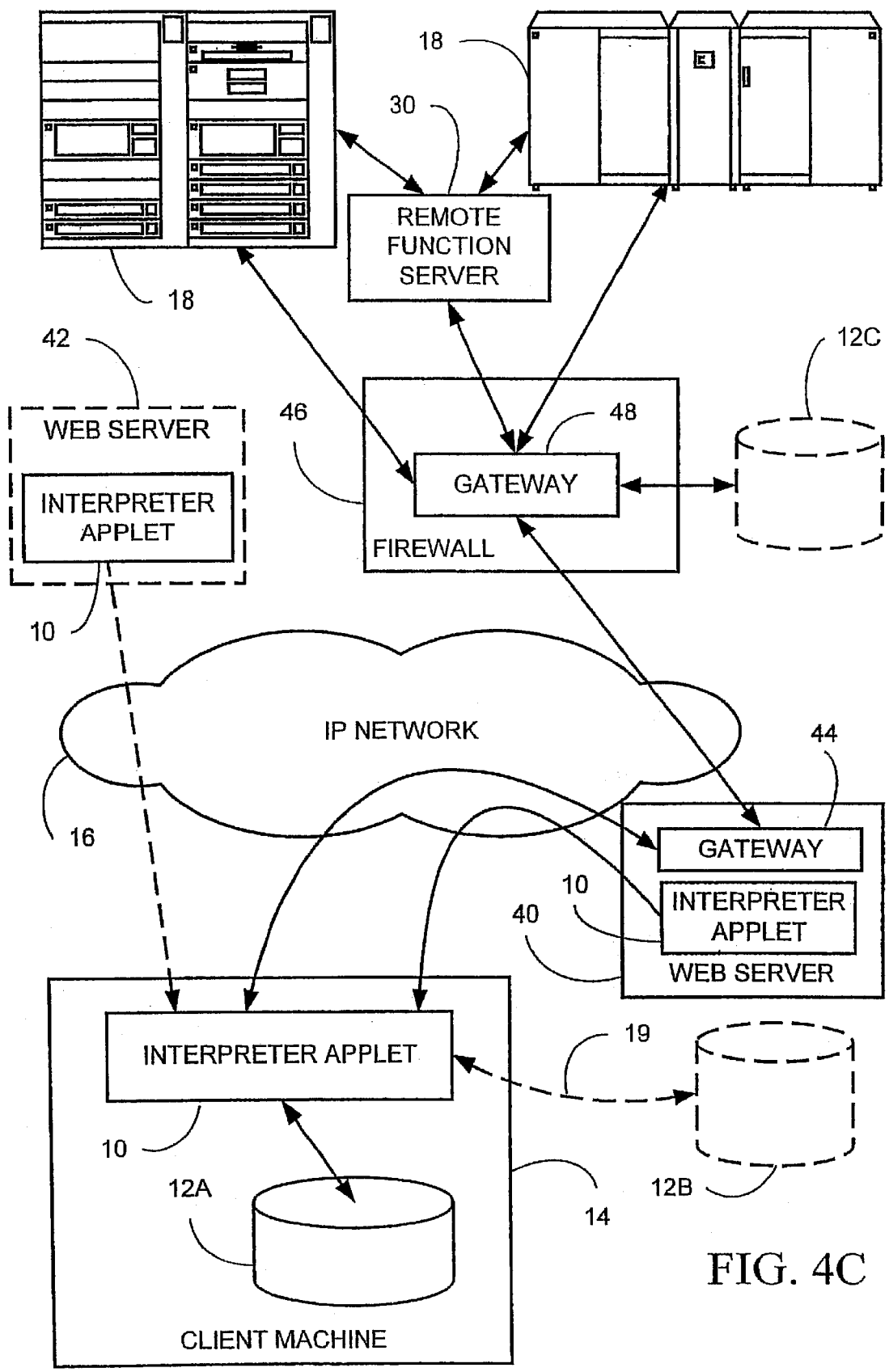

Reference is now made to FIGS. 4A, 4B and 4C, which are schematic illustrations of software systems according to further preferred embodiments of the present invention. FIGS. 4A, 4B and 4C are similar to FIG. 3, with slight additions. In FIG. 4A, the software system includes a Web server 40 connected to the IP network 16. In the event that the interpreter 10 comprises a Java applet running in a Web browser, the interpreter applet 10 needs to be previously downloaded to the client machine 14 via the IP network 16. The interpreter applet 10 may be downloaded from the Web server 40 or from any other Web server 42 comprising the interpreter applet 10 and connected to the IP network 16.

The Web server 40 includes a gateway 44 for the case where the Web browser security prevents the interpreter applet 10 from connecting to any machine other than the Web server 40. The gateway 44 reroutes communication between the interpreter applet 10 and other machines, such as the enterprise server 18, the remote function server 30 and the application rules database 12C.

In FIG. 4B, this enterprise server 18, the remote function server 30 and the application rules database 12C are located behind a firewall 46, and are therefore inaccessible by the interpreter 10. The firewall 46 includes a gateway 48 which reroutes communication between the interpreter 10 and the machines behind the firewall 46.

In FIG. 4C, the enterprise server 18, the remote function server 30 and the application rules database 12C are all located behind a firewall 46, and additionally, the Web browser security prevents the interpreter applet 10 from connecting to any machine other than the Web server 40. In this embodiment, the interpreter applet 10 communicates only with the gateway 44 at the Web server 40. The gateway 44 communicates with the gateway 48. Gateway 48 communicates with the machines behind the firewall 46.

Figure 5:
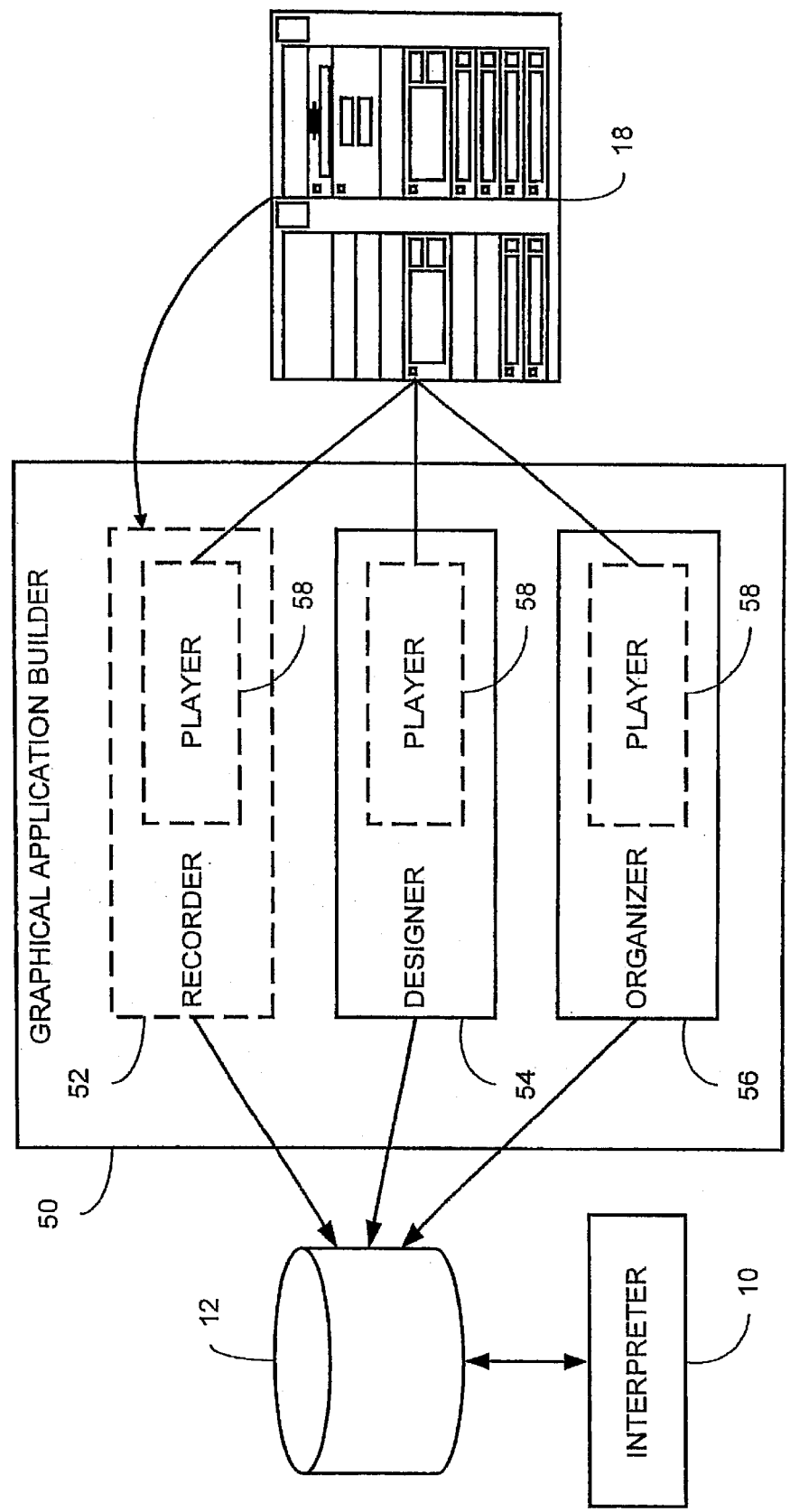
FIG. 5 is a schematic block diagram illustration of a graphical application builder, according to a preferred embodiment of the present invention.

The graphical application builder which is used by an application developer to develop applications and which produces the data contained in the application rules database 12 will now be explained with respect to FIGS. 5, 6A, 6B, 7 and 8, to which reference is now made. FIG. 5 is a schematic block diagram illustration of a graphical application builder, generally referenced 50, according to a preferred embodiment of the present invention. The graphical application builder 50 comprises a recorder 52, a designer 54 and an organizer 56. Development in the builder 50 is toolbox-based, using components properties and implementation methods similar to those used in Visual Basic. The recorder 52, designer 54 and organizer 56 each include a player 58 whose function will be explained hereinbelow. The recorder 52 and player 58 are optional components, used when developing applications from text-based, command oriented green screens of existing enterprise server applications.

Figure 6A:
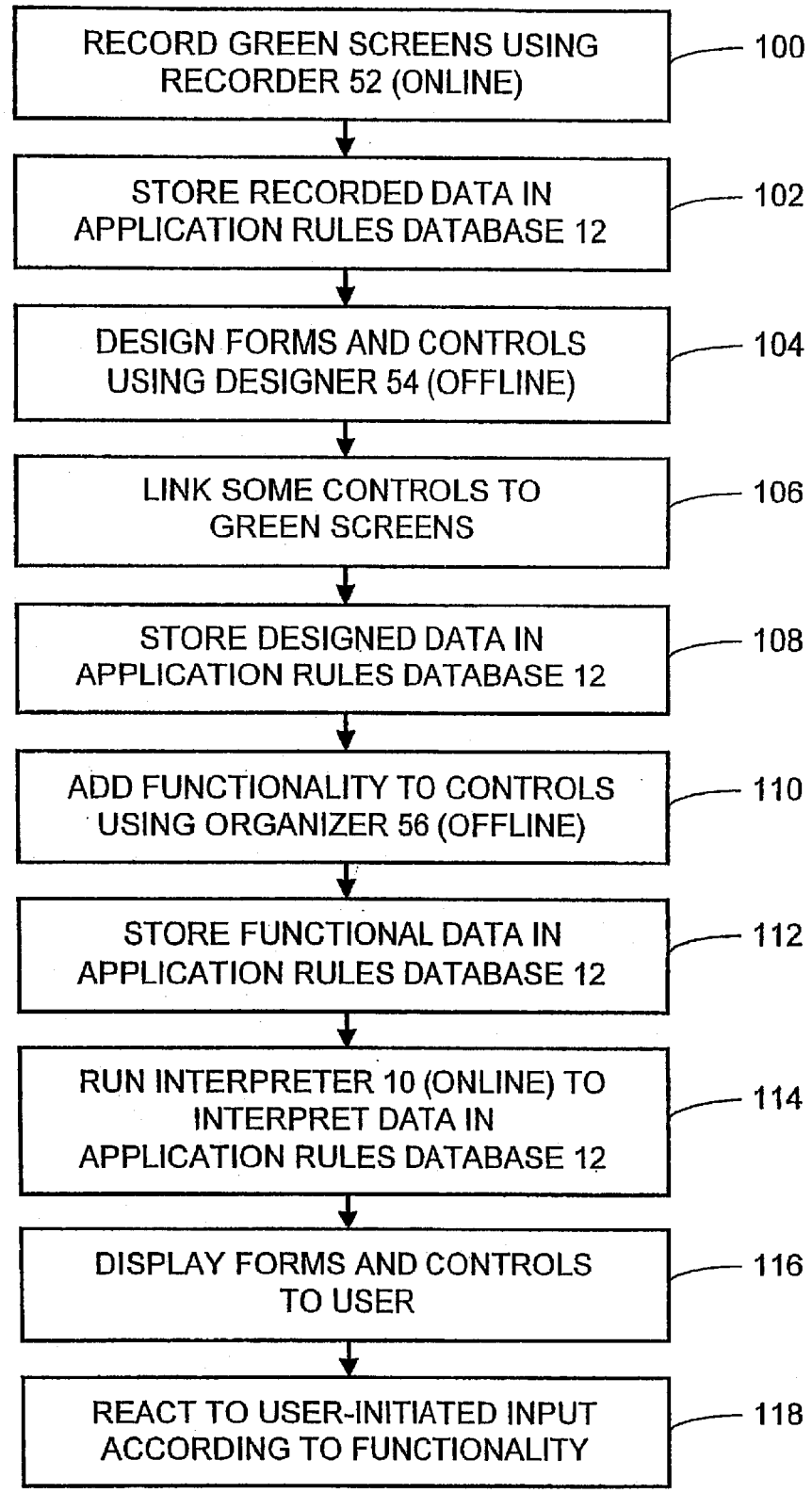
FIGS. 6A and 6B are schematic flowchart illustrations of methods for using the graphical application builder of FIG. 6, according to a preferred embodiment of the present invention.
Figure 6B:
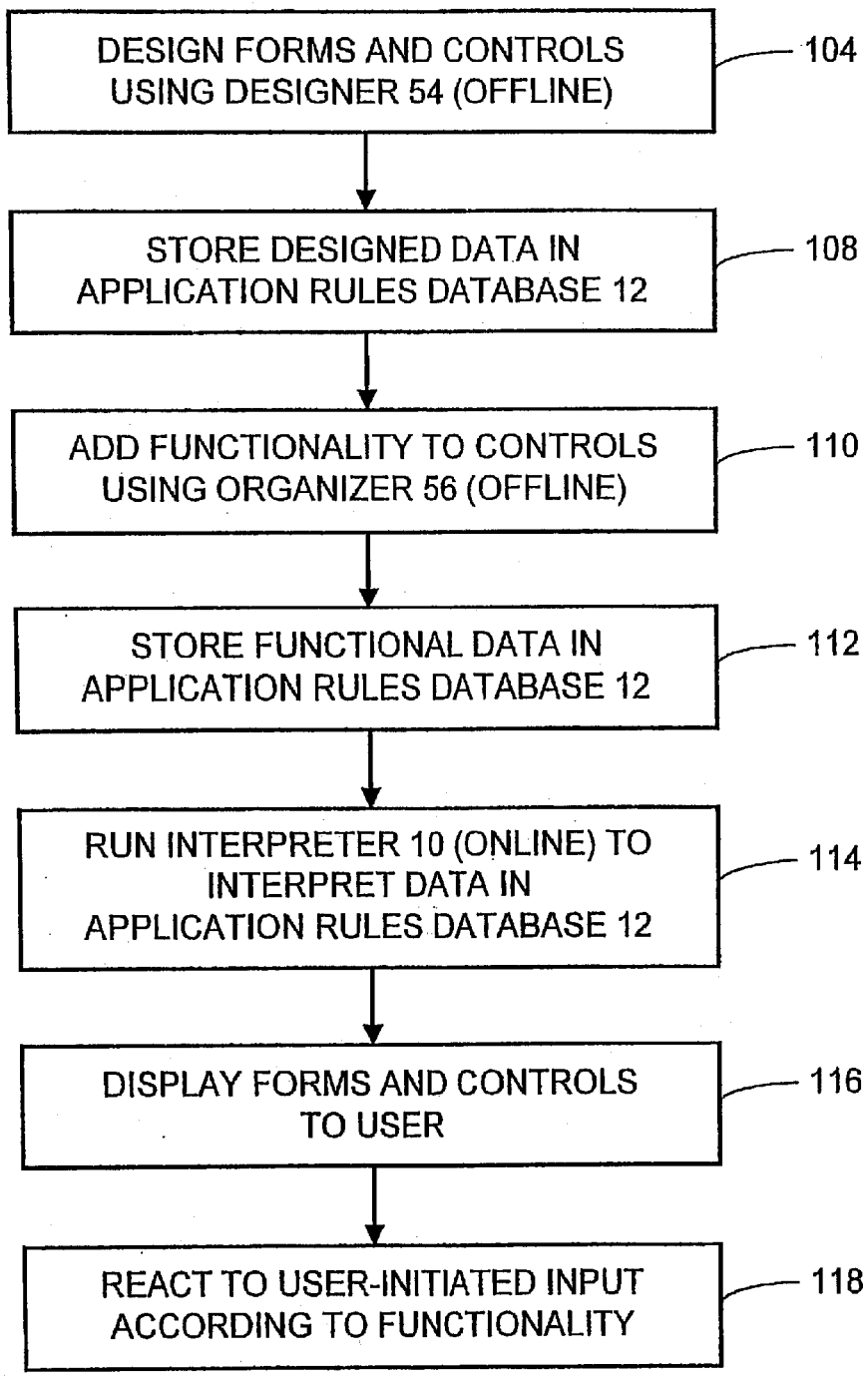

FIGS. 6A and 6B are schematic flowchart illustrations of methods for using the graphical application builder of FIG. 5, according to a preferred embodiment of the present invention. In FIG. 6A, the application developer uses the recorder 62 to record old screens of enterprise applications from the enterprise server 18 (step 100) and to save the screens in the application rules database 12 (step 102). Steps 100 and 102 are performed while the recorder 52 is connected online to the enterprise server 18. FIG. 7 shows a typical prior art green screen.

Figure 8:
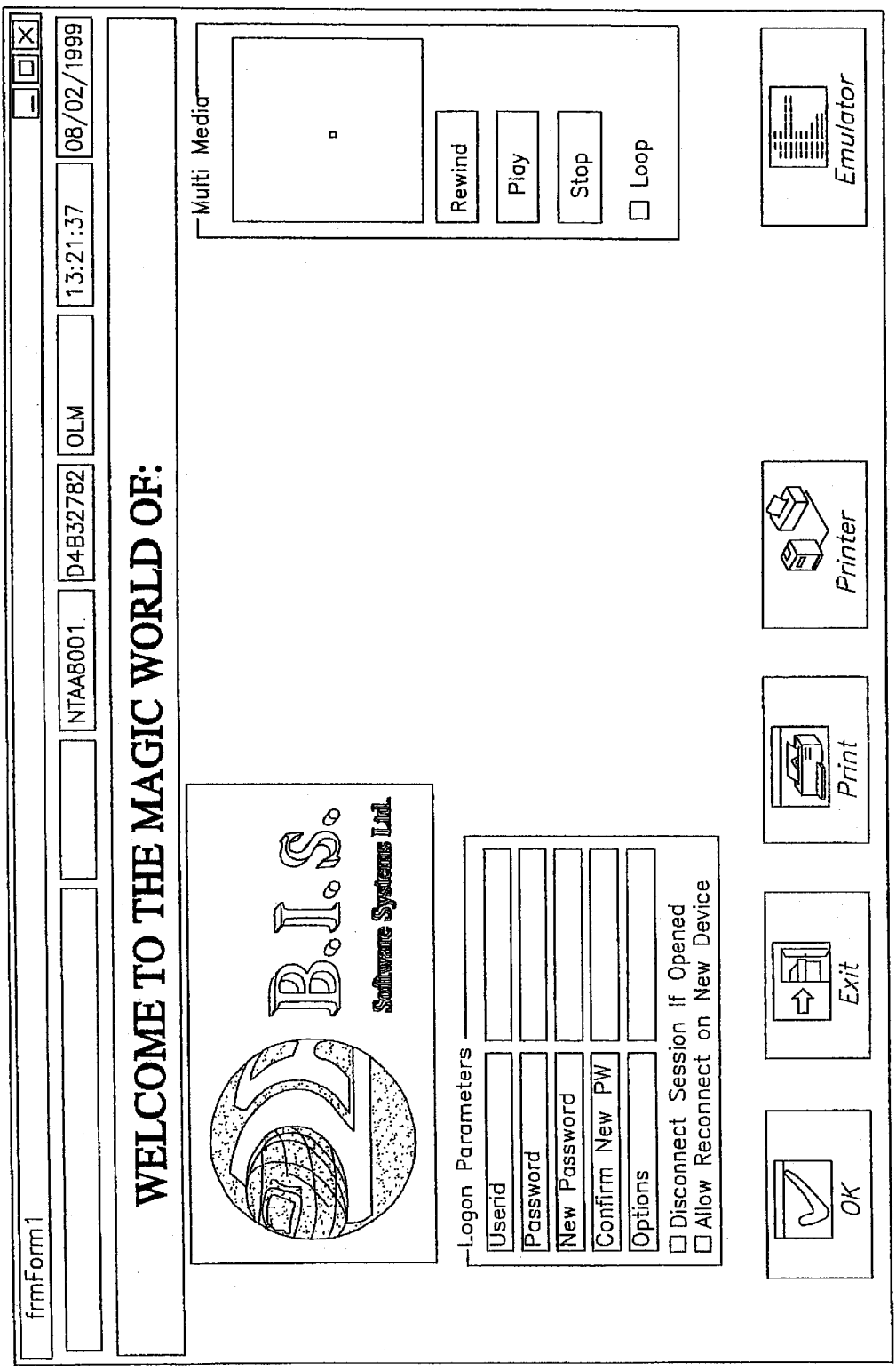
FIG. 8 is a schematic illustration of an example new screen that is a graphical version of the green screen of FIG. 7.

The application developer then uses the designer 54 to design forms and to add visual components known as "controls" to the forms (step 104). Non-limiting examples of different types of controls are labels, buttons, editable text boxes and list boxes. Controls have properties such as, but not limited to, type, size, location, color and font. The forms and their controls may be linked to green screens of the enterprise applications (step 106). Forms that are linked to green screens require the use of "templates", which are described hereinbelow with respect to FIGS. 7–12B. The data produced by the designer 54 is stored in the application rules database 12 (step 108). Steps 104, 106 and 108 are typically performed offline. FIG. 8 shows an example new screen which is a graphical version of the green screen of FIG. 7.

The application developer then uses the organizer 56 to add functionality to the controls created by the designer 54, by associating actions to be performed when a particular user-initiated event occurs (step 110). For example, an "OK" button may have the keyboard action <Enter> associated with it, and a "Cancel" button may have the function "clear" associated with it. The functional data is stored in the application rules database 12 (step 112). Steps 110 and 112 are typically performed offline.

In operation, the interpreter 10 interprets the data in the application rules database 12 (step 114). The forms and their controls are displayed by the interpreter 10 on the client machine to enable the user to run the application (step 116). The application reacts to user-initiated input according to the functionality defined by the organizer 56.

FIG. 6B is similar to FIG. 6A, with the exception that it shows the method of developing an application with the builder 50 without using green screens as a source. Step relating to the green screen and its data are shipped. Thus, steps 100, 102, and 106 do not appear.

As mentioned hereinabove, forms that are linked to green screens require the use of templates. A template coordinates designed information (from the designer 54) and functional information (from the organizer 56). When the interpreter 10 receives a green screen from an enterprise server 18, the interpreter 10 matches the screen to an appropriate template in the application rules database 12. If the green screen does not match any of the predefined template identifiers, the default template is used for that screen.

Figure 9:
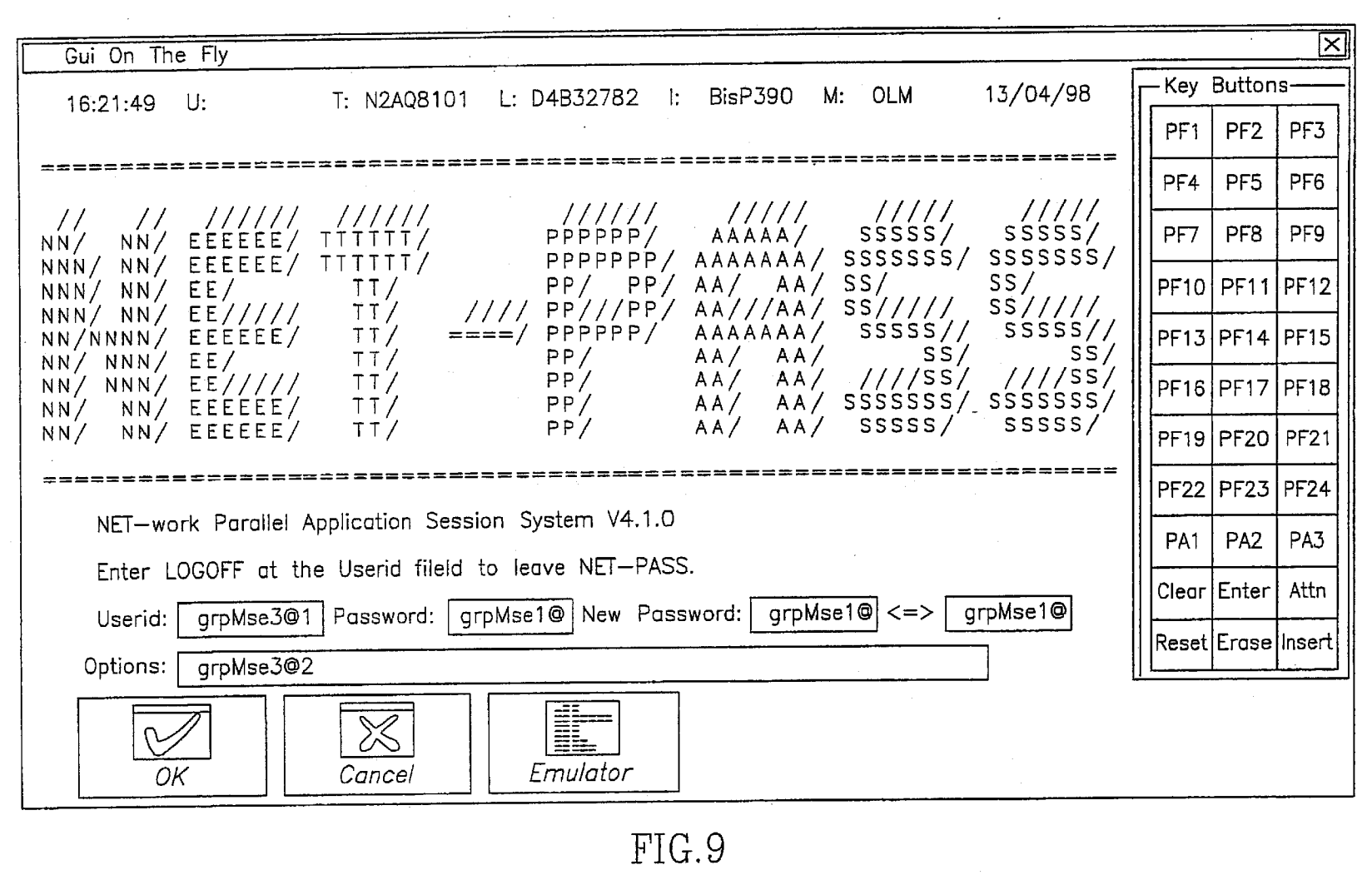

According to a preferred embodiment of the present invention, the default template creates a new screen in which every protected field of the green screen becomes a label control and every unprotected field of the green screen becomes an editable text box control. FIG. 9, to which reference is now made, is a schematic illustration of an example new screen, which is a graphical version of the green screen of FIG. 7 created using the default template. It will be appreciated that the application developer can alter the default template using the designer 54 and organizer 56.

Figure 10:
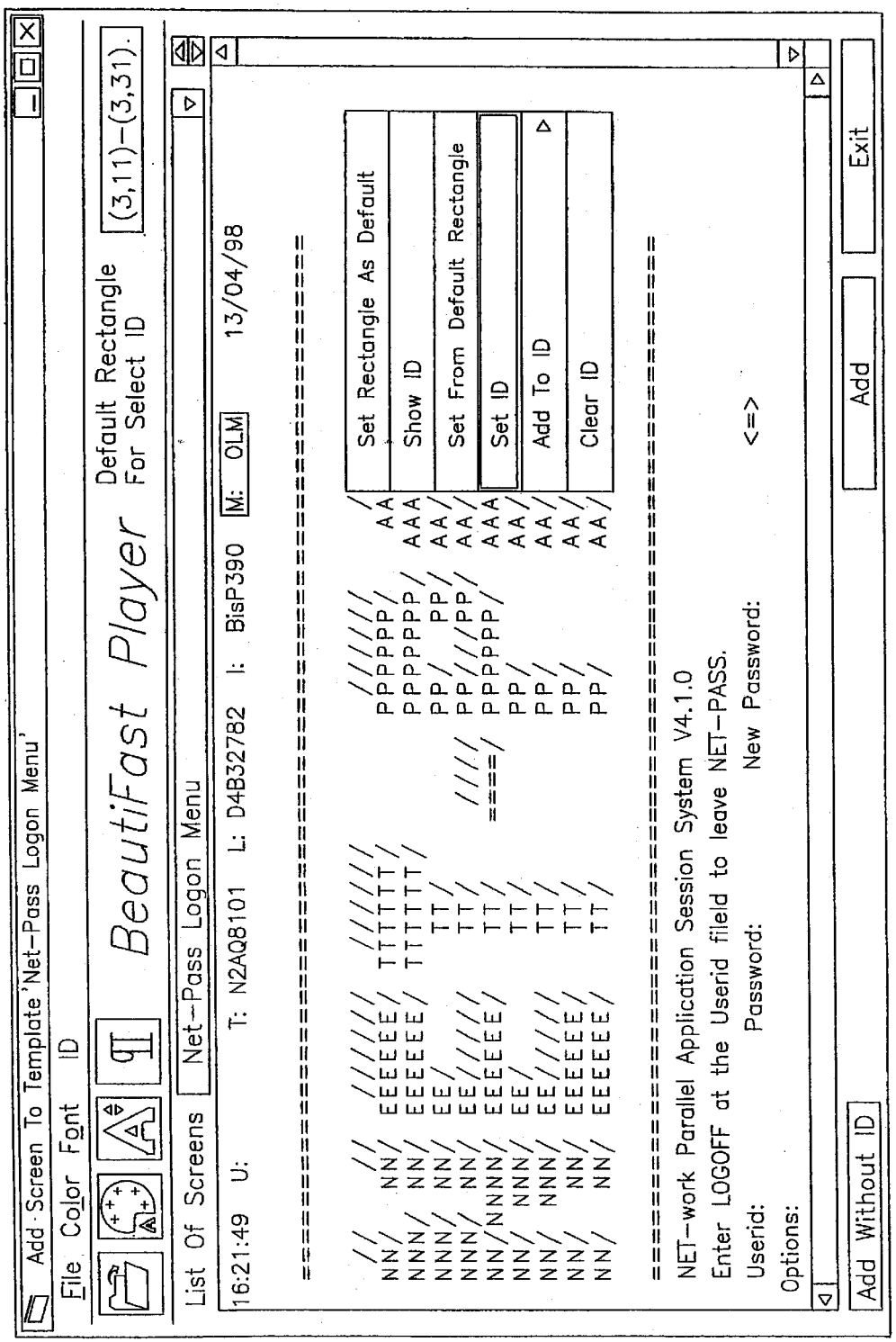
FIG. 10 is a schematic illustration of the green screen of FIG. 7, with a white rectangle denoting the green screen text identifier.

In comparison, the new screen of FIG. 8 is created using a template which is designed by the application developer. Controls on the form of the new screen are either static controls or dynamic controls. Static controls are controls whose properties are fully determined by the application developer at the time the form is designed. Only the control's properties, and not the criteria on which the properties are based, are saved in the application rules database 12. It will be appreciated that functionality defined using the organizer 56 can change properties of static controls at runtime. In contrast, for dynamic controls, both the properties and the criteria on which the properties are based are stored in the application rules database 12. When defining these criteria, the application developer graphically marks a rectangle on the green screen. The application developer selects whether to dynamically create a control for each item type in the rectangle. Non-limiting examples of item types include a word, a line, a field, and a rectangle. The application developer then indicates the field type. Non-limiting examples of the field type include whether the field is protected (i.e. non-editable), whether it is intensified, and whether it is visible. Finally, the application developer defines a pattern to be matched for the text content of the field. According to a preferred embodiment of the present invention, the text pattern matching is done using the PERL program. The data related to the template in the application rules database 12 includes text identifiers of green screens for which the template should be used. FIG. 10 to which reference is now made, shows a schematic illustration of the green screen of FIG. 7, with a white rectangle denoting the green screen text identifier. When the interpreter 10 receives a green screen from an enterprise server 18, the interpreter 10 searches the application rules database 12 for a template having a text identifier which matches the green screen. The text identifier "M: OLM" at the particular location of the white rectangle is matched to a particular template, resulting in a run-time new screen as shown in FIG. 8.

Figure 12A:
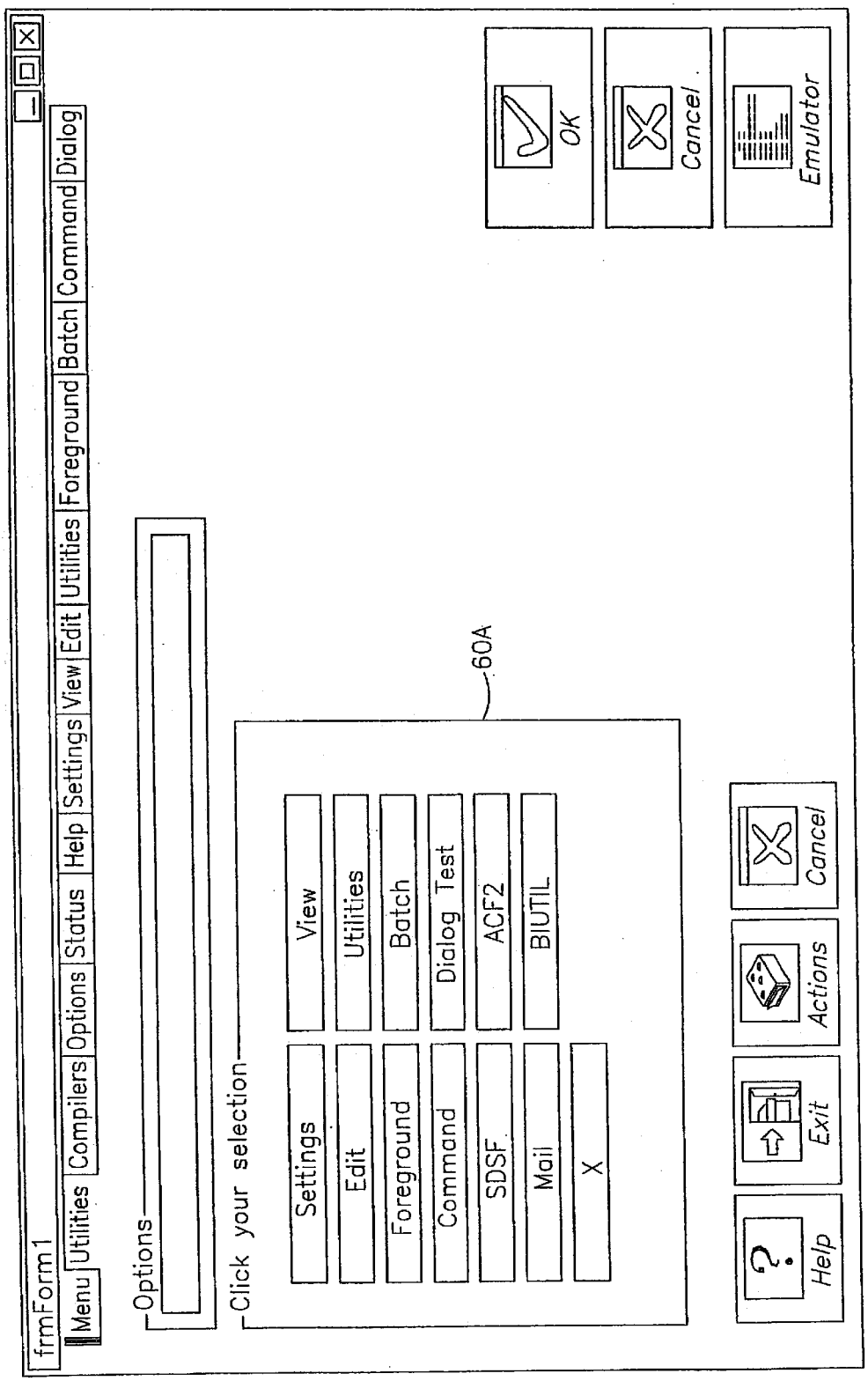
FIGS. 12A and 12B are schematic illustrations of example new screens that are graphical versions of the green screens of FIGS. 11A and 11B, respectively.
Figure 12B:
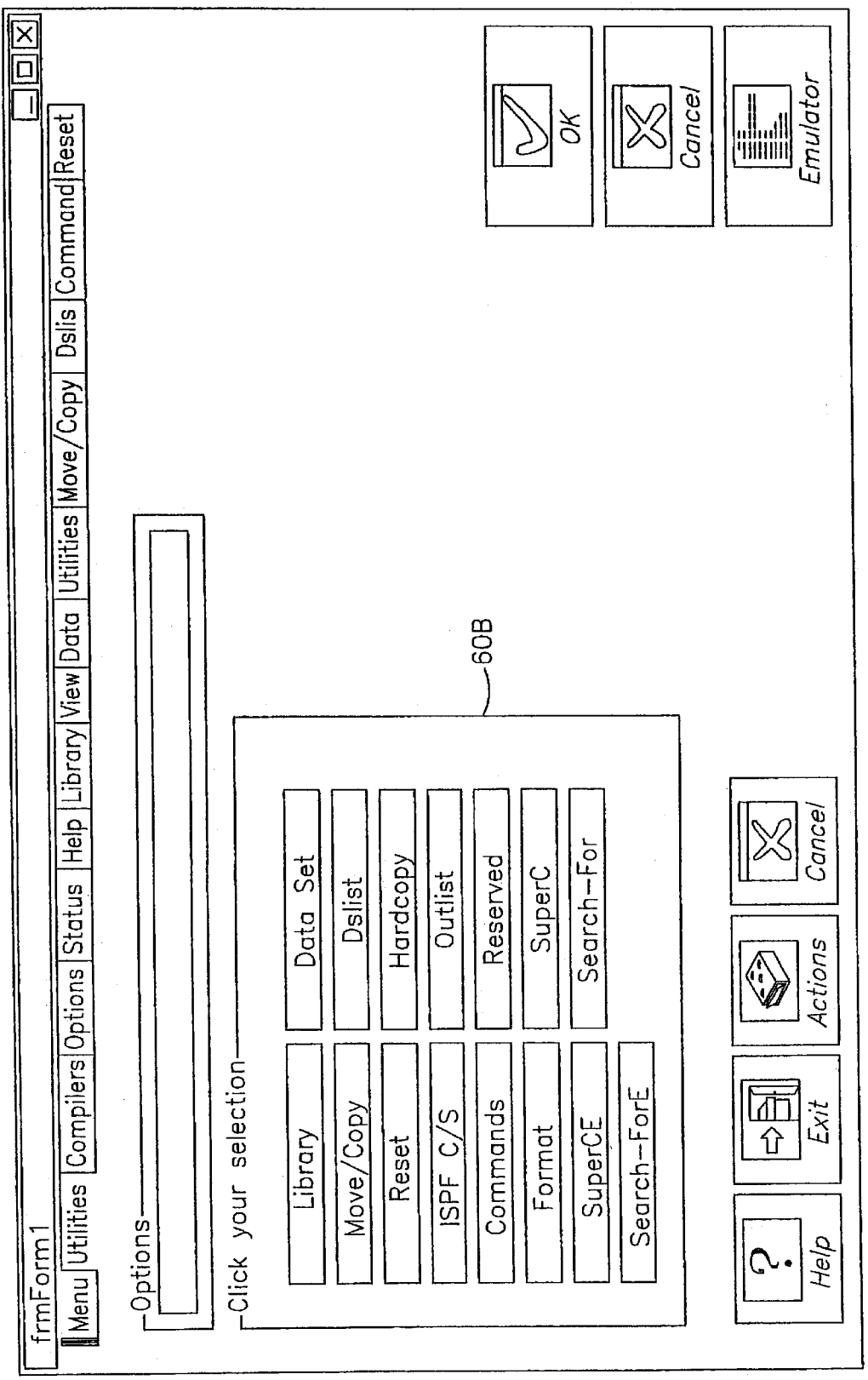

FIGS. 11A and 11B, to which reference is now made, are schematic illustrations of typical prior art green screens. The green screens are identified with the same template, which is obviously different from the template used for the new screen of FIG. 8. The identifier "Option ===>" appears in both green screens in the same location. The corresponding new screens are shown in FIGS. 12A and 12B, respectively. The container 60A of the new screen in FIG. 12A contains thirteen buttons, one for each option, whereas the container 60B of the new screen in FIG. 12B contains fifteen buttons. A single dynamic control is used for those buttons in the template for these two screens. At runtime, when the interpreter 10 receives the green screen from the enterprise server 18, and matches it to the template, the interpreter 10 dynamically determines the number of buttons and their content in the container. It will be appreciated that the use of dynamic controls decreases the amount of data that needs to be stored in the application rules database 12.

Dynamic controls have additional properties that are stored in the application rules database 12. Non-limiting examples include the horizontal and vertical spacing of the controls, the location of the control text relative to the item type in the green screen, and in how many columns to arrange the controls.

The buttons or the new screens in FIGS. 12A and 12B have functionality associated with them by the organizer 56. Since the buttons are a single dynamic control, the functionality is generic and flexible. In the present example, the application developer uses the organizer 56 to prescribe that when a user selects one of the buttons, the text to the left of the button text in the green screen is entered into the "Option ===>" field before the <Enter> key is emulated and sent to the enterprise server application.

It will be appreciated by persons skilled in the art that the present invention is not limited by what has been particularly shown and described herein above, rather the scope of the invention is defined by the claims that follow.

What is claimed is:

1. A software system comprising:
   a database to contain a plurality of data items, each of said data items corresponding to specific graphical presentation and specific functionality of at least one of a plurality of software applications; and
   an interpreter on a computer and coupled to said database, said interpreter including generic functionality for flow and graphical presentation of software applications wherein said interpreter is to interpret said data items and to present a portion of said specific graphical presentation corresponding to each said data item so as to enable a user to perform functions of a selected one of said plurality of software applications corresponding to said data item.

2. A software system according to claim 1, wherein said computer is connected to a network having an enterprise server computer connected thereto, and wherein said interpreter is to connect to said enterprise server computer thereby to perform functions of said at least one application on said enterprise server computer.

3. A software system according to claim 1, wherein said computer is connected to a network, the system further comprising:
   a remote function server, located on a second computer, said second computer connected to said network and to an enterprise server computer,
   wherein said interpreter is to instruct said remote function server to perform functions of said at least one application on said enterprise server computer.

4. A software system according to claim 1, wherein said computer is connected to a network, the system further comprising:
   a gateway connected to said network, said gateway to reroute communication between said interpreter and other computers connected to said network.

5. A software system according to claim 1, wherein said computer is connected to a network, the system further comprising:
   a gateway on a firewall connected to said network, said gateway to reroute communication between said interpreter and other computers located behind said firewall.

6. A software system according to claim 1, wherein said computer is connected to a network, the system further comprising:
   a first gateway connected to said network, said first gateway to reroute communication between said interpreter and other computers connected to said network; and
   a second gateway on a firewall connected to said network, said second gateway to reroute communication between said first gateway and other computers located behind said firewall.

7. A software system according to claim 1, wherein said computer is to access said database via a network.

8. A software system according to claim 7, wherein said network is the Internet or an Intranet.

9. A software system according to claim 1, the system further comprising:
   a graphical application builder to generate said data.

10. A software system according to claim 9, wherein said builder comprises:
    a designer to design new screens of said at least one application; and
    an organizer to assign specific functionality to controls of said new screens.

11. A software system according to claim 10, wherein said interpreter is to display said new screens on said computer.

12. A software system according to claim 10, wherein said interpreter is to react to user-initiated input according to said specific functionality.

13. A software system according to claim 10, wherein said builder further comprises:
    a recorder to record old screens of said at least one application.

14. A software system according to claim 13, wherein said designer and organizer are operative to design a template for new screens, said template having at least one dynamic control, and said designer is also operative to associate a portion of said old screens with said template.

15. A method for enabling a user of a computer to perform functions of a plurality of applications, the method comprising:

retrieving data related to specific graphical presentation and specific functionality of any of said plurality of applications from a database containing data related to specific graphical presentation and specific functionality of said plurality of applications; and interpreting said data to present said specific graphical presentation; and to enable said specific functionality for flow and graphical presentation of said any of said plurality of applications.

16. A method according to claim 15, wherein said computer is connected to a network having an enterprise server computer connected thereto, the method further comprising:

connecting to said enterprise server computer; and performing functions of said any of said plurality of applications on said enterprise server computer.

17. A method according to claim 15, wherein said computer is connected to a network having an enterprise server computer and a second computer connected thereto, the method further comprising:

instructing a remote function server located on said second computer to perform functions of said any of said plurality of applications on said enterprise server computer.

18. A method according to claim 15, wherein said computer is connected to a network having a gateway connected thereto, the method further comprising:

rerouting through said gateway communication between said interpreter and other computers connected to said network.

19. A method according to claim 15, wherein said computer is connected to a network having a gateway on a firewall connected thereto, the method further comprising:

rerouting through said gateway communication between said interpreter and other computers located behind said firewall.

20. A method according to claim 15, wherein said computer is connected to a network having a first gateway connected thereto and a second gateway on a firewall connected thereto, the method further comprising:

rerouting by said first gateway communication between said interpreter and other computers connected to said network; and rerouting by said second gateway communication between said first gateway and other computers located behind said firewall.

21. A method according to claim 15, wherein retrieving said data comprises said computer accessing said database via a network.

22. A method according to claim 21, wherein said network is the Internet or the Intranet.

23. A method according to claim 15, the method further comprising:

generating said data with a graphical application builder.

24. A method according to claim 21, wherein said data comprises:

designing new screens of said plurality of applications; and assigning specific functionality to controls of said new screens.

25. A method according to claim 21, the method further comprising:

displaying said new screens on said computer.

26. A method according to claim 21, the method further comprising:

reacting to user-initiated input according to said specific functionality.

27. A method according to claim 21, the method further comprising:

recording old screens of said application.

28. A method according to claim 27, the method further comprising:

designing a template for new screens, said template having at least one dynamic control; and associating a portion of said old screens with said template.

29. A computer program embodied on a computer-readable medium, the computer program comprising:

a first code segment operative to retrieve data related to specific graphical presentation and specific functionality of at least one software application from a database containing data related to specific graphical presentation and specific functionality of a plurality of software applications; and a second code segment operative to interpret said data to present a portion of said specific graphical presentation on said computer so as to enable a user of a computer running said computer program to perform functions of said at least one software application, said second code segment including generic functionality for flow and graphical presentation of software applications.

* * * * *